(12) United States Patent
Kamimura

(10) Patent No.: US 12,089,043 B2
(45) Date of Patent: *Sep. 10, 2024

(54) DISPLAY APPARATUS AND DISPLAY METHOD

(71) Applicant: MAXELL, LTD., Kyoto (JP)

(72) Inventor: Junji Kamimura, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,666

(22) Filed: Feb. 22, 2023

(65) Prior Publication Data
US 2023/0199491 A1 Jun. 22, 2023

Related U.S. Application Data

(63) Continuation of application No. 17/009,426, filed on Sep. 1, 2020, now Pat. No. 11,611,880, which is a
(Continued)

(51) Int. Cl.
*H04W 12/08* (2021.01)
*G06F 3/14* (2006.01)
(Continued)

(52) U.S. Cl.
CPC ............ *H04W 12/08* (2013.01); *G06F 3/147* (2013.01); *G09G 5/12* (2013.01); *H04L 63/083* (2013.01);
(Continued)

(58) Field of Classification Search
CPC ....... H04N 21/43615; H04N 21/43637; H04N 21/4122; H04N 21/4126; H04N 9/3194;
(Continued)

(56) References Cited

U.S. PATENT DOCUMENTS

| 7,996,045 B1 | 8/2011 | Bauer |
| 8,375,284 B2 | 2/2013 | Hirose |

(Continued)

FOREIGN PATENT DOCUMENTS

| CN | 102802155 A | 11/2012 |
| JP | 2004-145858 A | 5/2004 |

(Continued)

OTHER PUBLICATIONS

International Search Report, PCT/JP2015/051871, Apr. 7, 2015, 2pgs.

(Continued)

*Primary Examiner* — Techane Gergiso
(74) *Attorney, Agent, or Firm* — Volpe Koenig

(57) ABSTRACT

An image display system includes a first terminal device and with a second terminal device whose usable function range is smaller than a usable function range of the first terminal device. The image display system includes a display projection unit, a communication unit that establishes wireless connection with the first and second terminal devices, a control unit that manages the wireless connection, and a connection control image generating unit. The control unit and the connection control image generating unit generate a terminal connection image including information for connecting the second terminal device with the image display system, based on terminal connection permission information that assigns the second terminal device whose wireless connection with the display system is permitted, the terminal connection permission information being transmitted from the first terminal device. The display projection unit displays the terminal connection image.

6 Claims, 14 Drawing Sheets

Related U.S. Application Data continuation of application No. 15/544,916, filed as application No. PCT/JP2015/051871 on Jan. 23, 2015, now Pat. No. 10,798,575.

(51) Int. Cl.

| | | |
|---|---|---|
| *G06F 3/147* | (2006.01) | |
| *G09G 5/12* | (2006.01) | |
| *H04L 9/40* | (2022.01) | |
| *H04N 9/31* | (2006.01) | |
| *H04N 21/41* | (2011.01) | |
| *H04N 21/436* | (2011.01) | |
| *H04N 21/4363* | (2011.01) | |
| *H04W 12/06* | (2021.01) | |
| *H04W 12/50* | (2021.01) | |
| *H04W 12/71* | (2021.01) | |
| *H04W 12/77* | (2021.01) | |

(52) U.S. Cl.
CPC ........ *H04L 63/0876* (2013.01); *H04L 63/105* (2013.01); *H04N 9/3194* (2013.01); *H04N 21/4122* (2013.01); *H04N 21/4126* (2013.01); *H04N 21/43615* (2013.01); *H04N 21/43637* (2013.01); *H04W 12/06* (2013.01); *H04W 12/50* (2021.01); *G06F 3/1454* (2013.01); *G09G 2358/00* (2013.01); *H04W 12/71* (2021.01); *H04W 12/77* (2021.01)

(58) Field of Classification Search
CPC ..... H04W 12/06; H04W 12/08; H04W 12/71; H04W 12/50; H04W 12/77; H04L 63/083; H04L 63/105; H04L 63/0876; G06F 3/147; G06F 3/1454; G09G 2358/00; G09G 5/12
See application file for complete search history.

(56) References Cited

U.S. PATENT DOCUMENTS

| | | | |
|---|---|---|---|
| 8,756,501 | B1 | 6/2014 | Karam |
| 8,832,796 | B2 | 9/2014 | Miyake |
| 9,472,939 | B1 | 10/2016 | Hart |
| 10,334,003 | B2* | 6/2019 | Yang .................. H04N 21/632 |
| 11,556,224 | B1* | 1/2023 | Laukkanen ........... G06F 3/1454 |
| 2004/0044904 | A1 | 3/2004 | Yamazaki |
| 2005/0036509 | A1* | 2/2005 | Acharya ............ H04N 21/4753 |
| | | | 370/467 |
| 2006/0195495 | A1 | 8/2006 | Asano |
| 2007/0266094 | A1 | 11/2007 | Chang et al. |
| 2008/0052514 | A1 | 2/2008 | Nakae |
| 2008/0074560 | A1 | 3/2008 | Ichieda |
| 2008/0111765 | A1 | 5/2008 | Kim |
| 2008/0120668 | A1 | 5/2008 | Yau |
| 2008/0129816 | A1 | 6/2008 | Mattila et al. |
| 2008/0273109 | A1 | 11/2008 | Bamford |
| 2008/0307311 | A1* | 12/2008 | Eyal ...................... H04W 4/185 |
| | | | 707/999.102 |
| 2009/0009605 | A1 | 1/2009 | Ortiz |
| 2009/0325607 | A1 | 12/2009 | Conway et al. |
| 2010/0146077 | A1* | 6/2010 | Davies ................... G06F 16/78 |
| | | | 709/219 |
| 2010/0177080 | A1 | 7/2010 | Essinger et al. |
| 2010/0257450 | A1 | 10/2010 | Go et al. |
| 2010/0333175 | A1 | 12/2010 | Cox et al. |
| 2011/0044563 | A1 | 2/2011 | Blose et al. |
| 2011/0185437 | A1 | 7/2011 | Tran et al. |
| 2011/0312278 | A1 | 12/2011 | Matsushita et al. |
| 2012/0054022 | A1 | 3/2012 | Kosashvili |
| 2012/0098733 | A1 | 4/2012 | Masuda et al. |
| 2012/0147126 | A1 | 6/2012 | Suzuki |
| 2012/0173622 | A1* | 7/2012 | Toledano ............... H04L 65/611 |
| | | | 709/204 |
| 2012/0178368 | A1 | 7/2012 | Fleck et al. |
| 2012/0210379 | A1* | 8/2012 | McCoy ............ H04N 21/64322 |
| | | | 725/109 |
| 2013/0040617 | A1 | 2/2013 | Lee |
| 2013/0073388 | A1 | 3/2013 | Heath |
| 2013/0079063 | A1 | 3/2013 | Jouin et al. |
| 2013/0110892 | A1* | 5/2013 | Wood ..................... G06F 16/176 |
| | | | 707/827 |
| 2013/0234946 | A1 | 9/2013 | Moon |
| 2013/0291037 | A1 | 10/2013 | Im et al. |
| 2013/0312044 | A1 | 11/2013 | Itagaki |
| 2013/0335582 | A1 | 12/2013 | Itasaki et al. |
| 2014/0051054 | A1 | 2/2014 | Wong et al. |
| 2014/0068689 | A1* | 3/2014 | Sirpal .............. H04N 21/42224 |
| | | | 725/109 |
| 2014/0089421 | A1* | 3/2014 | Morris ..................... G06F 9/541 |
| | | | 709/206 |
| 2014/0136978 | A1 | 5/2014 | Verma |
| 2014/0143231 | A1* | 5/2014 | Adari .................. G06F 16/9535 |
| | | | 707/769 |
| 2014/0245166 | A1 | 8/2014 | Morton |
| 2014/0258334 | A1* | 9/2014 | Mukasa .............. G06F 21/6218 |
| | | | 707/781 |
| 2014/0289788 | A1* | 9/2014 | Evans .................... H04H 40/27 |
| | | | 725/116 |
| 2015/0019694 | A1* | 1/2015 | Feng ........................ H04L 65/75 |
| | | | 709/219 |
| 2015/0052447 | A1 | 2/2015 | Ritesh |
| 2015/0074826 | A1 | 3/2015 | Shuto |
| 2015/0082365 | A1 | 3/2015 | Okada et al. |
| 2015/0109186 | A1 | 4/2015 | Layson |
| 2015/0128073 | A1 | 5/2015 | Ahn et al. |
| 2015/0149529 | A1 | 5/2015 | Loader et al. |
| 2015/0234787 | A1 | 8/2015 | Itamoto |
| 2015/0382075 | A1* | 12/2015 | Neumeier ........... G06F 16/7847 |
| | | | 725/34 |
| 2016/0147492 | A1* | 5/2016 | Fugate .................. G06F 3/1423 |
| | | | 345/633 |
| 2017/0078740 | A1 | 3/2017 | Iwami et al. |
| 2017/0116479 | A1 | 4/2017 | Ouchi et al. |
| 2017/0118258 | A1* | 4/2017 | Lieb ....................... G06F 9/452 |

FOREIGN PATENT DOCUMENTS

| | | |
|---|---|---|
| JP | 2006-092365 A | 4/2006 |
| JP | 2008-077380 A | 4/2008 |
| JP | 2010-271431 A | 12/2010 |
| JP | 2014-035607 A | 2/2014 |
| JP | 2015-177285 A | 10/2015 |

OTHER PUBLICATIONS

Chinese Office Action dated Sep. 4, 2019 for Chinese Patent Application No. 201580074099.2.

* cited by examiner

DISPLAY APPARATUS AND DISPLAY METHOD

CROSS REFERENCE TO RELATED APPLICATIONS

This application is a continuation of U.S. patent application Ser. No. 17/009,426 filed on Sep. 1, 2020, which is a continuation of U.S. patent application Ser. No. 15/544,916 filed on Jul. 20, 2017, now U.S. Pat. No. 10,798,575 issued on Jul. 20, 2017, which claims priority to PCT/JP2015/051871 filed on Jan. 23, 2015, all of which are incorporated by reference herein in its entirety.

TECHNICAL FIELD

The present invention relates to a display apparatus and a display method, and, more particularly, relates to a technique that is effective for connection between a communication terminal and a display apparatus, such as a projector and a liquid crystal display.

BACKGROUND ART

As a typical one of display apparatuses, for example, a projector is cited. The projector is used so often in a case in which lots of people watch the same image together because the projector can easily project an image on a large screen. For example, the projector is used in a presentation in a conference room, various briefing sessions held in school, etc.

Projectors have been significantly improved in image quality in recent years, and it is not uncommon to see projectors providing images as clear as full-high definition images. Thus, the projector has developed into the optimum apparatus for many people to watch a high-quality image on a large screen.

An ICT (Information and Communication Technology) is adopted into a function of such a projector, and therefore, the way of using the projector has significantly changed. Generally, a personal computer is used as a device that inputs the images to the projector. As a method of connection between them, a wired connection has been a mainstream method.

However, popularization of a PDA (Personal Digital Assistant) such as a smartphone and a tablet terminal has led to many cases of usage of a connection method using the PDA through a wireless system represented by a wireless LAN (Local Area Network).

Merits of the wireless connection is to enable an image to be sent to the projector from a location where a cable cannot reach, to only require to select an apparatus to be connected by a communication without time and effort for changing wiring connection when images from a plurality of devices are displayed in time series, to significantly reduce the number of wiring, and others.

Note that this type of the connection technique of the image display apparatus includes, for example, a technique of facilitating a procedure for making a network connection to the image display apparatus such as the projector (e.g., see Patent Document 1).

PRIOR ART DOCUMENT

Patent Document

Patent Document 1: Japanese Patent Application Laid-open Publication No. 2008-77380

SUMMARY OF THE INVENTION

Problems to be Solved by the Invention

In order to establish a wireless connection between a communication terminal which is an image input device and an image display apparatus through such a wireless system as a wireless LAN as described above, a little experience and knowledge are required, and there are some cases in which the connection is not easily established even if the connection is practically attempted with reference to an instruction manual.

Further, there is a risk of causing communication with an irrelevant communication terminal such as a smartphone and a tablet terminal located outside a conference hall, which results in unintentional information transmission to such a communication terminal.

The communication terminals for which the connection is permitted include, for example, a communication terminal for an ordinary participant and a communication terminal for a host. The host's communication terminal is authorized to some extent, and therefore, it is required for the projector having the wireless communication function to identify the terminals so as to distinguish them from each other.

However, the display apparatus such as the projector does not have a technique of distinguishing the ordinary participant's communication terminal from the host's communication terminal, and therefore, there is a risk of loading information, etc., stored in the host's communication terminal to the ordinary participant's communication terminal through the display apparatus.

An object of the present invention is to provide a technique capable of identifying a communication terminal connected an image display apparatus through a simple connection operation, which results in prevention of information leakage.

The above and other object and novel characteristics of the present invention will be apparent from the description of the present specification and the accompanying drawings.

Means for Solving the Problems

The typical summary of the inventions disclosed in the present application will be briefly described as follows.

That is, a typical display apparatus is an apparatus that can be wirelessly communicated to a first terminal device and to a second terminal device whose usable function range is limited to be smaller than that of the first terminal device. This display apparatus includes a display unit, a communication unit, and a control unit. The display unit displays an image. The communication unit wirelessly connects the first terminal device and the second terminal device. A management control unit manages the wireless connection between the first terminal device and the second terminal device.

Based on connection information that permits connection to an assigned second terminal device, the connection information being transmitted from the first terminal device, the management control unit generates a terminal connection image for connecting the second terminal device to the display apparatus. The display unit displays the terminal connection image generated by the management control unit.

Particularly when the communication unit and the first terminal device start communicating with each other, the management control unit performs a process different from a process including generation and display of the terminal connection image.

Further, the typical display apparatus includes a time unit that outputs current date and time information. When generating the terminal connection image, the management control unit acquires the current date and time information from the time unit, and adds the acquired current date and time information to the terminal connection image.

Effects of the Invention

The effects obtained by typical aspects of the present invention disclosed in the present application will be briefly described below.

The convenience of a user can be improved.

BRIEF DESCRIPTIONS OF THE DRAWINGS

DETAILED DESCRIPTION OF PREFERRED EMBODIMENTS

In the following embodiments, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the following embodiments, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the following embodiments, it goes without saying that the components (including element steps) are not always indispensable unless otherwise stated or except the case where the components are apparently indispensable in principle.

Similarly, in the following embodiments, when the shape of the components, positional relation thereof, and the like are described, the substantially approximate and similar shapes and the like are included therein unless otherwise stated or except the case where it is conceivable that they are apparently excluded in principle. The same goes for the numerical value and the range described above. Also, the same members are denoted by the same reference symbols throughout all the drawings for describing the embodiments, and the repetitive description thereof is omitted. Hereinafter, the embodiments will be described in detail.

First Embodiment

<First Configuration Example of Image Display System>

Figure 1:
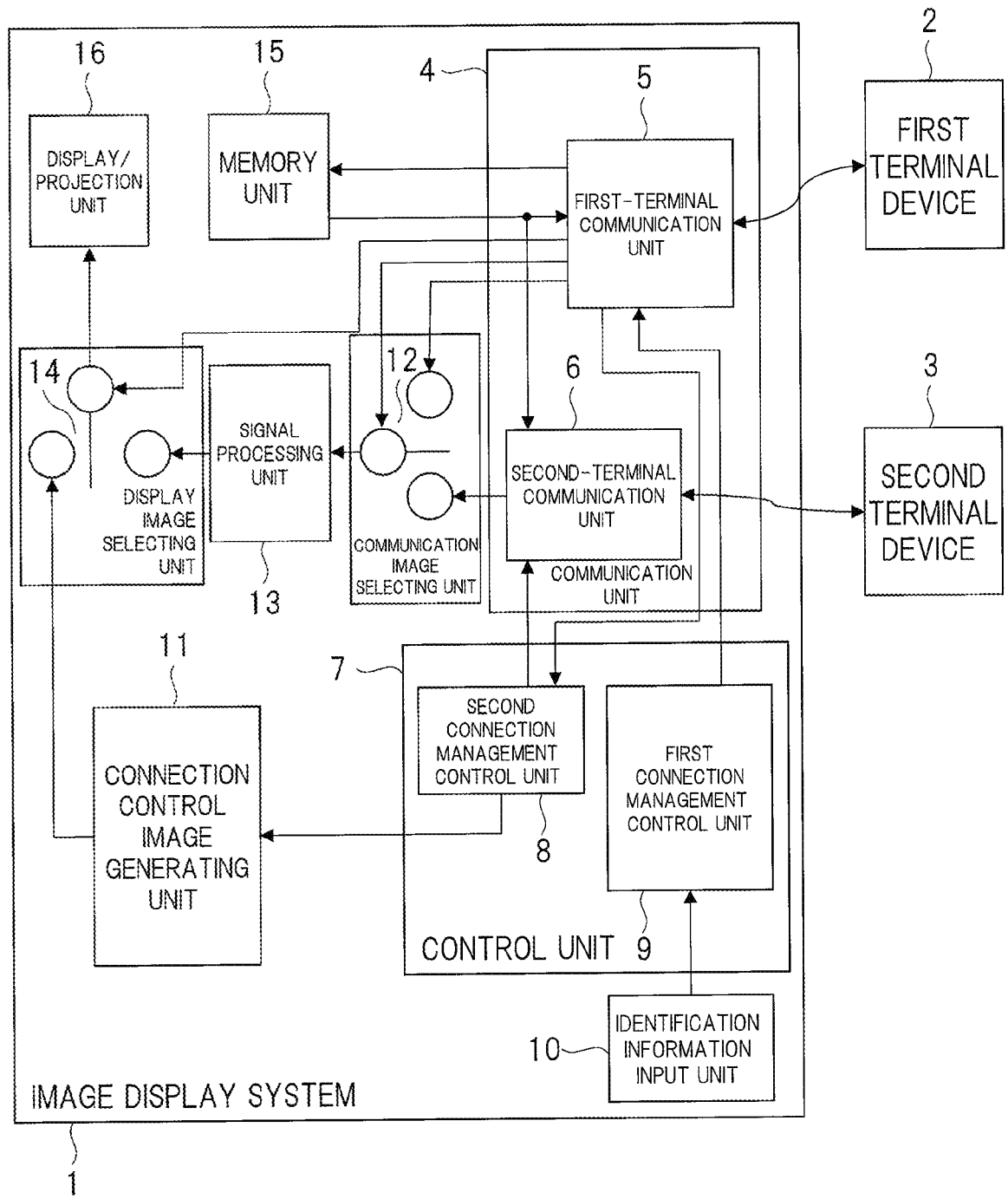
FIG. 1 is a block diagram showing an example of a configuration of an image display system according to a first embodiment.

FIG. 1 is a block diagram showing an example of a configuration of an image display system 1 according to a first embodiment.

The image display system 1 is a display apparatus having a communication function, such as a projector. As shown in FIG. 1, each of a first terminal device 2 and a second terminal device 3 is connected to the image display system 1 that is the display apparatus. Each of the first terminal device 2 and the second terminal device 3 transmits an image to be displayed by the image display system 1. The first terminal device 2 and the second terminal device are connected to the image display system 1 through, for example, a wireless communication system such as a wireless LAN.

The first terminal device 2 has an authority by which the largest number of functions of the image display system 1 can be used. The second terminal device 3 has an authority smaller than that of the first terminal device 2, that is, the second terminal device 3 is a terminal having the smaller number of the functions.

Note that FIG. 1 shows a case in which each of the number of first terminal device 2 and the number of second terminal device 3 is one. A configuration having a plurality of first terminal devices 2 and a plurality of second terminal devices 3 may be also adopted.

The image display system 1 includes a communication unit 4, a control unit 7, an identification information input unit 10, a connection control image generating unit 11, a communication image selecting unit 12, a signal processing unit 13, a display image selecting unit 14, a memory unit 15, and a display projection unit 16.

The communication unit 4 communicates with the first terminal device 2 and with the second terminal device 3. As described above, the communication performed by the communication unit 4 is the wireless communication system such as wireless LAN. The communication unit 4 has a communication unit 5 for the first terminal and a second-terminal communication unit 6.

The first-terminal communication unit 5 communicates with the first terminal device 2, and controls the operations of the communication image selecting unit 12 and the memory unit 15. The second-terminal communication unit 6 communicates with the second terminal device 3, and outputs an image acquired through the communication.

The identification information input unit 10 inputs identification information for identifying the first terminal device 2. The identification information input unit 10 is prepared as, for example, a keyboard, on which a password or others serving as the identification information is input. The identification information may be not the password but, for example, an authenticated fingerprint. In this case, the identification information input unit 10 is composed of a fingerprint authenticating device, etc.

The control unit 7 is composed of a second connection management control unit 8 and a first connection management control unit 9. The second connection management control unit 8 controls the second-terminal communication unit 6 and the connection control image generating unit 11 based on information output from the first-terminal communication unit 5.

Specifically, based on the incoming information from the first-terminal communication unit 5, the second connection management control unit 8 instructs the second-terminal communication unit 6 to make the limited connection with the second terminal device 3, and also issues such an instruction as generating an image with information for the connection to the connection control image generating unit 11. The management control unit is composed of the control unit 7 and the connection control image generating unit 11.

Based on the incoming information from the second connection management control unit 8, the connection control image generating unit 11 generates an image including the limit information of the second terminal device 3 in order to facilitate the connection to the second terminal device 3. Here, the image generated by the connection control image generating unit 11 is an image with information such as a QR (Quick Response) code.

The communication image selecting unit 12 selects an image output from either the first-terminal communication unit 5 or the second-terminal communication unit 6, based on a selection signal output from the first-terminal communication unit 5. The signal processing unit 13 performs a signal processing on an output signal output from the communication image selecting unit 12 to convert the signal into image data.

The display image selecting unit 14 selects an image output from either the signal processing unit 13 or the connection control image generating unit 11, based on a selection signal output from the first-terminal communication unit 5. The memory unit 15 stores the result of the communication performed by the first-terminal communication unit 5. By the first-terminal communication unit 5, the data reading/writing from/to the memory unit 15 is controlled. The display projection unit 16, which serves as a display unit, projects an image output from the display image selecting unit 14.

Here, note that the projector is exemplified as the image display system 1. However, the image display system 1 may have a different configuration from the projector. For example, the image display system may be a liquid crystal display apparatus.

At this time, the image display system 1 that is the liquid crystal display apparatus can be achieved by replacing the display projection unit 16 of the configuration in FIG. 1 with a display unit using such a display panel as a liquid crystal panel.

Subsequently, the connection in the image display system 1 of FIG. 1 will be described.

An output portion of the identification information input unit 10 is connected to an input portion of the first connection management control unit 9, and an output portion of the first connection management control unit 9 is connected to an input portion of the first-terminal communication unit 5.

The second connection management control unit 8 has two output portions in which the input portion of the second-terminal communication unit 6 is connected to one of these two output portions while the input portion of the connection control image generating unit 11 is connected to the other of the same.

An output portion of the second-terminal communication unit 6 is connected to one input portion of the communication image selecting unit 12. An output portion of the first-terminal communication unit 5 is connected to each of an input portion of the memory unit 15, the other input portion of the communication image selecting unit 12, an input portion of the second connection management control unit 8, a control terminal of the display image selecting unit 14, and a control terminal of the communication image selecting unit 12.

An output portion of the memory unit 15 is connected to each of an input portion of the first-terminal communication unit 5 and an input portion of the second-terminal communication unit 6. An output portion of the communication image selecting unit 12 is connected to an input portion of the signal processing unit 13, and one input portion of the display image selecting unit 14 is connected to an output portion of the signal processing unit 13.

The other input portion of the display image selecting unit 14 is connected to an output portion of the connection control image generating unit 11. To an output portion of the display image selecting unit 14, an input portion of the display projection unit 16 is connected. The first terminal device 2 transmits/receives data to/from the first-terminal communication unit 5 through the wireless communication, and the second terminal device 3 transmits/receives data to/from the second-terminal communication unit 6 through the wireless communication.

Subsequently, an operation of the image display system 1 of FIG. 1 will be described.

<Operation Example of Image Display System>

Figure 2:
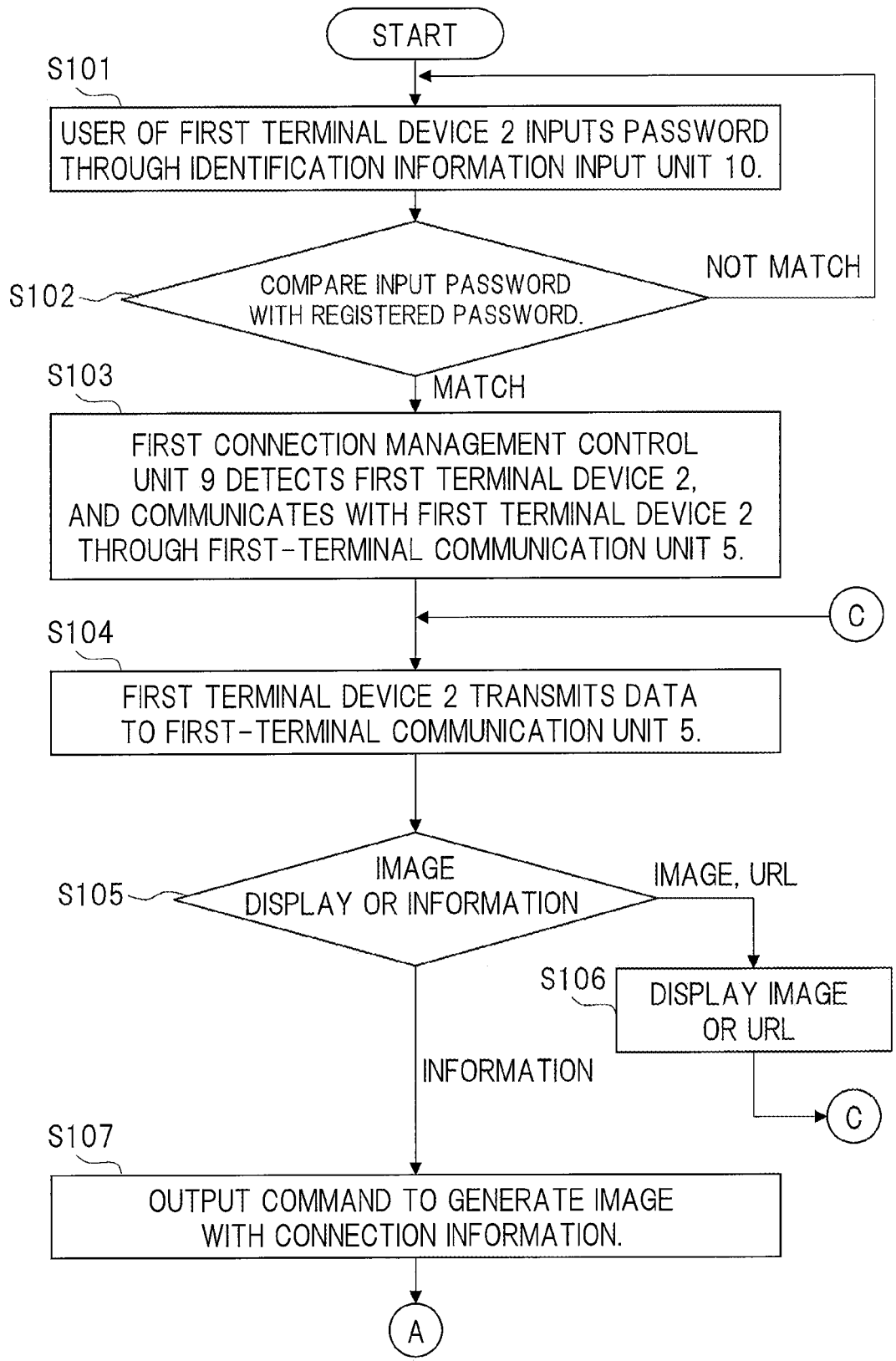
FIG. 2 is a flowchart showing an example of an operation of the image display system of FIG. 1.
Figure 3:
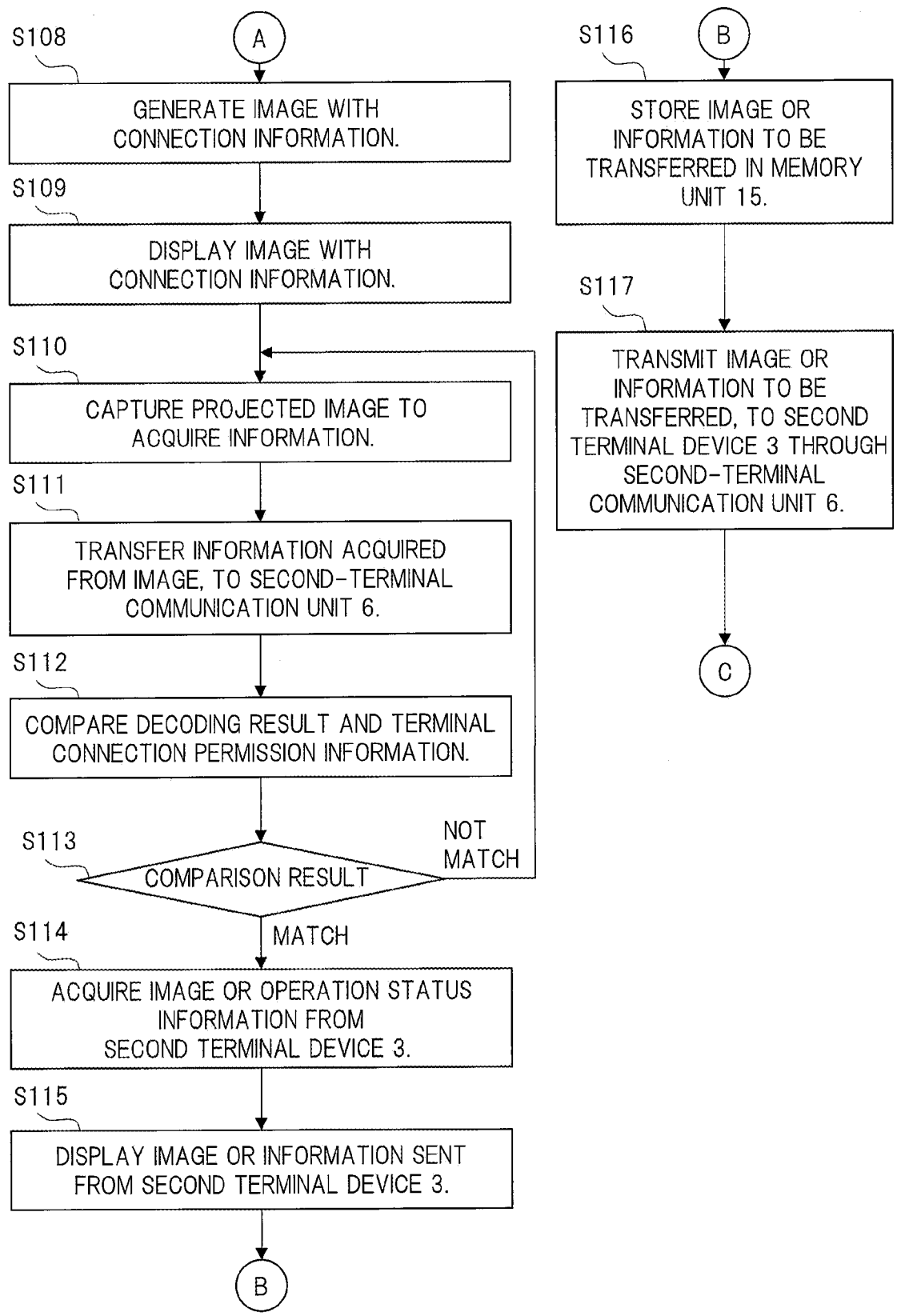
FIG. 3 is a flowchart continued from FIG. 2.

FIG. 2 is a flowchart showing an example of an operation of the image display system 1 of FIG. 1, and FIG. 3 is a flowchart that continued from FIG. 2. FIGS. 2 and 3 show an example of an identification connection process in which the first terminal device 2 and the second terminal device 3 are distinguished from each other and are connected by the image display system 1.

First, a password for making the image display system 1 identify the first terminal device 2 is input to the image display system 1 (step S101). As the password input, a user of the first terminal device 2 enters the password through the identification information input unit 10. As described above, the identification information is not limited to the password, another identification information such as an authenticated fingerprint may be authorized.

When the password has been entered, the first connection management control unit 9 searches previously-registered passwords to determine whether any password matches the entered password (step S102). If any password matches the entered password, the first connection management control unit 9 detects the first terminal device 2 corresponding to the matching password. If any password does not match, the process flow returns to step S101.

Here, the previously-registered passwords are stored in a memory not shown in, for example, the first connection management control unit 9. Alternatively, the passwords may be stored in the memory unit 15.

As the previously-registered passwords, one password is linked to one first connection management control unit 9. Therefore, by the determination of the password matching the entered password out of the registered passwords, the first terminal device 2 to be intentionally connected to the image display system 1 can be identified.

Then, the first connection management control unit 9 communicates with the detected first terminal device 2 through the first-terminal communication unit 5 (step S103). Through this communication, the first terminal device 2 transmits data to the image display system 1 (step S104). This data is an image or an URL (Uniform Resource Locator) to be projected, or terminal connection permission information.

The terminal connection permission information is the information that assigns a second terminal device 3 whose connection to the image display system 1 is permitted. The second terminal device 3 is previously provided with, for example, a unique identification number, etc., and this identification number is transmitted as the terminal connection permission information.

The image display system 1 determines that the transmitted data from the first terminal device 2 is any one of the image or the URL to be projected or the terminal identification permission information (step S105). Since the identification connection process has been described here, the terminal identification permission information is transmitted.

When the transmitted data is the image or the URL to be projected, the first-terminal communication unit 5 outputs a selection signal to the communication image selecting unit 12 and to the display image selecting unit 14.

In this manner, the communication image selecting unit 12 establishes the connection so as to output the image or the URL to be projected, which has been received by the first-terminal communication unit 5, to the signal processing unit 13. The display image selecting unit 14 establishes the connection so as to output an image generated by the signal processing by the signal processing unit 13 to the display projection unit 16. In this manner, a route through which the image, etc., transmitted from the first terminal device 2 is output to the display projection unit 16 is established, so that the image is displayed by the display projection unit 16 (step S106).

When the URL is transmitted from the first terminal device 2 in the process of step S104, note that the first-terminal communication unit 5 accesses the URL through Internet from the wireless LAN, and outputs a homepage accessed in a process at step S106 to the display projection unit 16 to display the homepage.

On the other hand, when the transmitted data is determined to be the terminal identification permission information at step S105, the first-terminal communication unit 5 outputs the terminal connection permission information to the second connection management control unit 8.

The second connection management control unit 8 outputs the terminal connection permission information to the connection control image generating unit 11, and also outputs such an instruction as generating an image with the connection information to the connection control image generating unit 11 (step S107).

When receiving the instruction, the connection control image generating unit 11 generates the image with the connection information as shown in FIG. 3 (step S108). This image with the connection information is the image indicating the second terminal device 3 whose connection to the image display system 1 is permitted by the terminal identification permission information, and is displayed as, for example, a QR code or others.

The first-terminal communication unit 5 outputs a selection signal to the display image selecting unit 14. In this manner, the display image selecting unit 14 establishes the connection so as to output the image with the connection information, which has been generated by the connection control image generating unit 11, to the display projection unit 16.

The image with the connection information which has been generated by the connection control image generating unit 11 is projected by the display projection unit 16 through the display image selecting unit 14 (step S109).

Subsequently, the second terminal device 3 captures the image with the connection information, i.e., the QR code projected by the display projection unit 16 by using an image-capturing unit 50 such as a camera shown in FIG. 4 and included in the second terminal device 3, so that the information for the connection to the image display system 1 is acquired (step S110).

The second terminal device 3 decodes the QR code acquired in the process of step S110, and transmits the decoded information to the second-terminal communication unit 6 (step S111). The decoding result includes the identification number attached to the second terminal device 3.

The second-terminal communication unit 6 compares the decoding result transmitted from the second-terminal communication unit 6 and the terminal connection permission information received in the process of step S104, and determines whether they match each other (step S112). In other words, the second-terminal communication unit 6 determines whether the identification number transmitted from the second terminal device 3 is included in the terminal connection permission information.

If the decoding result matches the terminal connection permission information received in the process of step S104 (step S113), the second-terminal communication unit 6 permits the communication with the second terminal device 3. If the decoding result does not match the terminal connection permission information, the second-terminal communication unit 6 does not permit the communication, and then, the process flow returns to step S110.

Thus, the second terminal device 3 transmits an image or information to the second-terminal communication unit 6 (step S114). If the decoding result does not match the terminal connection permission information, the process flow returns to step S110.

Subsequently, based on the determination result at step S113, i.e., based on the determination that the decoding result matches the terminal connection permission information received in the process of step S104, the first terminal device 2 outputs a selection signal to the communication image selecting unit 12 and to the display image selecting unit 14 so that the image transmitted from the second terminal device 3 is projected.

Thus, the communication image selecting unit 12 establishes the connection so as to output the image received by the second-terminal communication unit 6 to the signal processing unit 13, and the display image selecting unit 14 establishes the connection so as to output an image generated by the signal processing of the signal processing unit 13 to the display projection unit 16. As a result, the desired image transmitted from the second terminal device 3 is projected (step S115).

Subsequently, when it is desired to cause the second terminal device 3 to display an image, information or others transmitted from the first terminal device 2, processes of the following steps S116 and S117 are perform ed.

First, through the communication with the first-terminal communication unit 5, the first terminal device 2 transmits an image, information or others to be transferred to the connected second terminal device 3. When receiving the image, the information or others to be transferred from the first-terminal communication unit 5, the first-terminal communication unit 5 accesses the memory unit 15 to store the received image, information or others in the memory unit 15 (step S116).

Subsequently, the first-terminal communication unit 5 reads the stored image, information or others out of the memory unit 15, and outputs the read image, information or others to the second-terminal communication unit 6. The second-terminal communication unit 6 transmits the read image, information or others to the second terminal device 3 (step S117). Then, the process flow returns to the process in step S104 of FIG. 2, the process flow stands by for new data transfer from the first terminal device 2.

In the manner as described above, the operation processes by the image display system 1 end.

When the second terminal device 3 acquires the projected image with the information by using the image-capturing unit 50 in the process of step S110, the second terminal device 3 may compare an identification number for the second terminal device 3 whose wireless communication is permitted, the identification number being included in the image with the information, with the identification number previously provided to the second terminal device 3. If these identification numbers match each other, the process flow proceeds to step S111. If these identification numbers do not match each other, the wireless connection process may be ended.

Next, a configuration of the first terminal device 2 and an operation of the same will be described with reference to FIGS. 4 and 5.

<Configuration Example of First Terminal Device>

Figure 4:
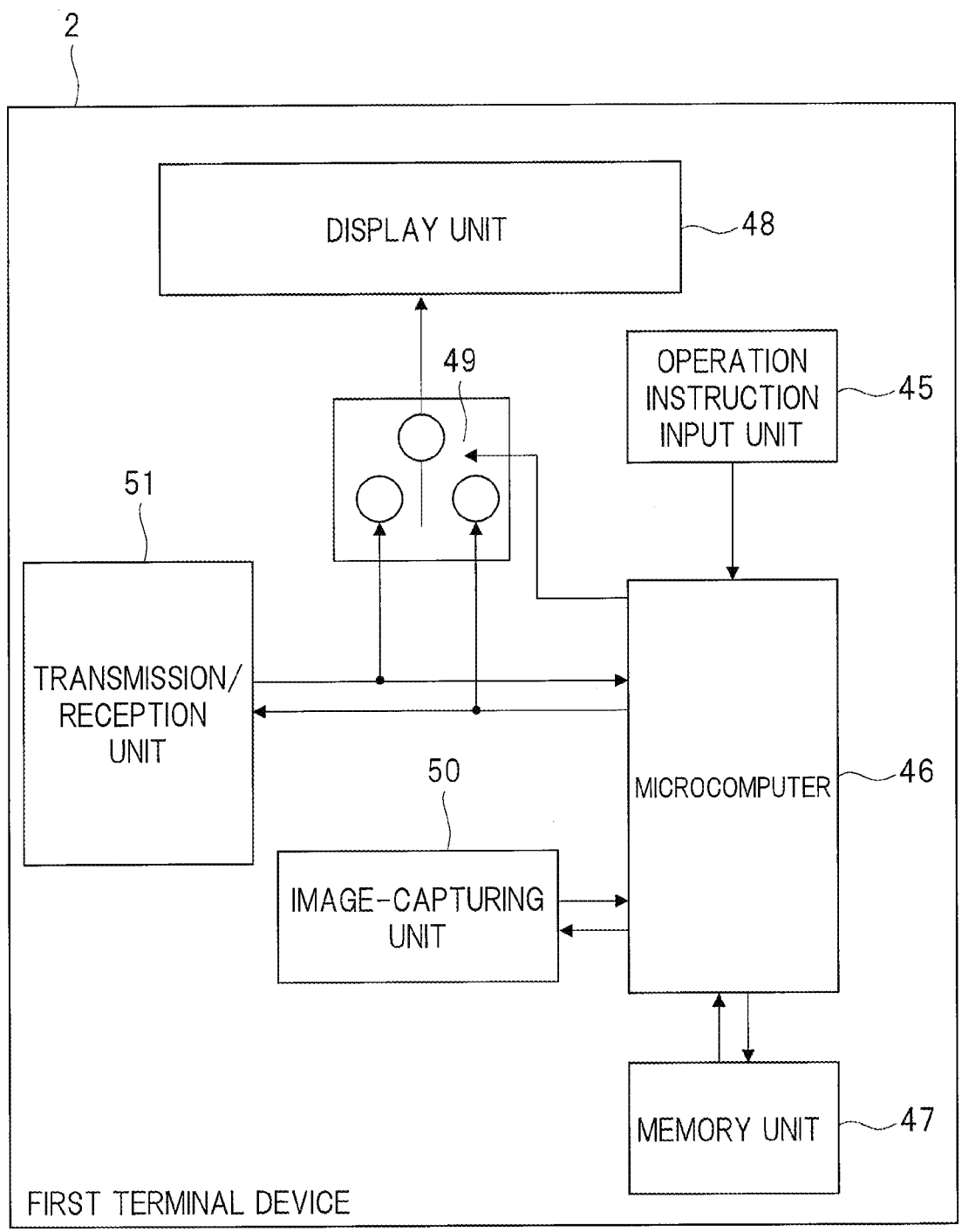
FIG. 4 is a block diagram showing an example of a configuration of a first terminal device of FIG. 1.

FIG. 4 is a block diagram showing an example of a configuration of the first terminal device 2 of FIG. 1. Note that FIG. 4 shows the configuration of the first terminal device 2. However, the same configuration is adopted to the second terminal device 3 of FIG. 1.

As shown in FIG. 4, the first terminal device 2 is composed of a configuration having an operation instruction input unit 45, a microcomputer 46, a memory unit 47, a display unit 48, a display image selecting unit 49, the image-capturing unit 50, and a transmission/reception unit 51.

The operation instruction input unit 45 selects an operation of the first terminal device 2 and gives an instruction. The microcomputer 46 is composed of, for example, a CPU, which manages control over the first terminal device 2. Under the control by the microcomputer 46, the memory unit 47 stores images and various pieces of information, and reads them.

The display unit 48 is composed of a display, etc., which displays an image, information, etc. The display image selecting unit 49 selects an image, information, etc., to be displayed on the display unit 48, out of images, information, etc., transmitted from the image display system 1 or images, information, etc., output from the microcomputer 46. The image-capturing unit 50 is composed of, for example, a camera, which takes a picture. The transmission/reception unit 51 performs data transmission/reception to/from the image display system 1.

Subsequently, the connection in each block of the first terminal device 2 will be described.

To the microcomputer 46, signals which are output from the operation instruction input unit 45, the memory unit 47, the image-capturing unit 50, and the transmission/reception unit 51 are input. To the microcomputer 46, each of the memory unit 47, the image-capturing unit 50, the transmission/reception unit 51, and the display image selecting unit 49 is connected.

The data reading/writing operations from/to the memory unit 47 are controlled by the microcomputer 46. The image capturing by the image-capturing unit 50 is also controlled by the microcomputer 46. The operation of the transmission/reception unit 51 is also controlled by the microcomputer 46.

To a control terminal of the display image selecting unit 49, a selection signal from the microcomputer 46 is input. Based on the selection signal output from the microcomputer 46, the display image selecting unit 49 selects the image or the information output from either the microcomputer 46 or the transmission/reception unit 51, and outputs the selected image or information to the display unit 48.

<Example of Operation of First Terminal Device>

Subsequently, an operation of the first terminal device 2 will be described.

Figure 5:
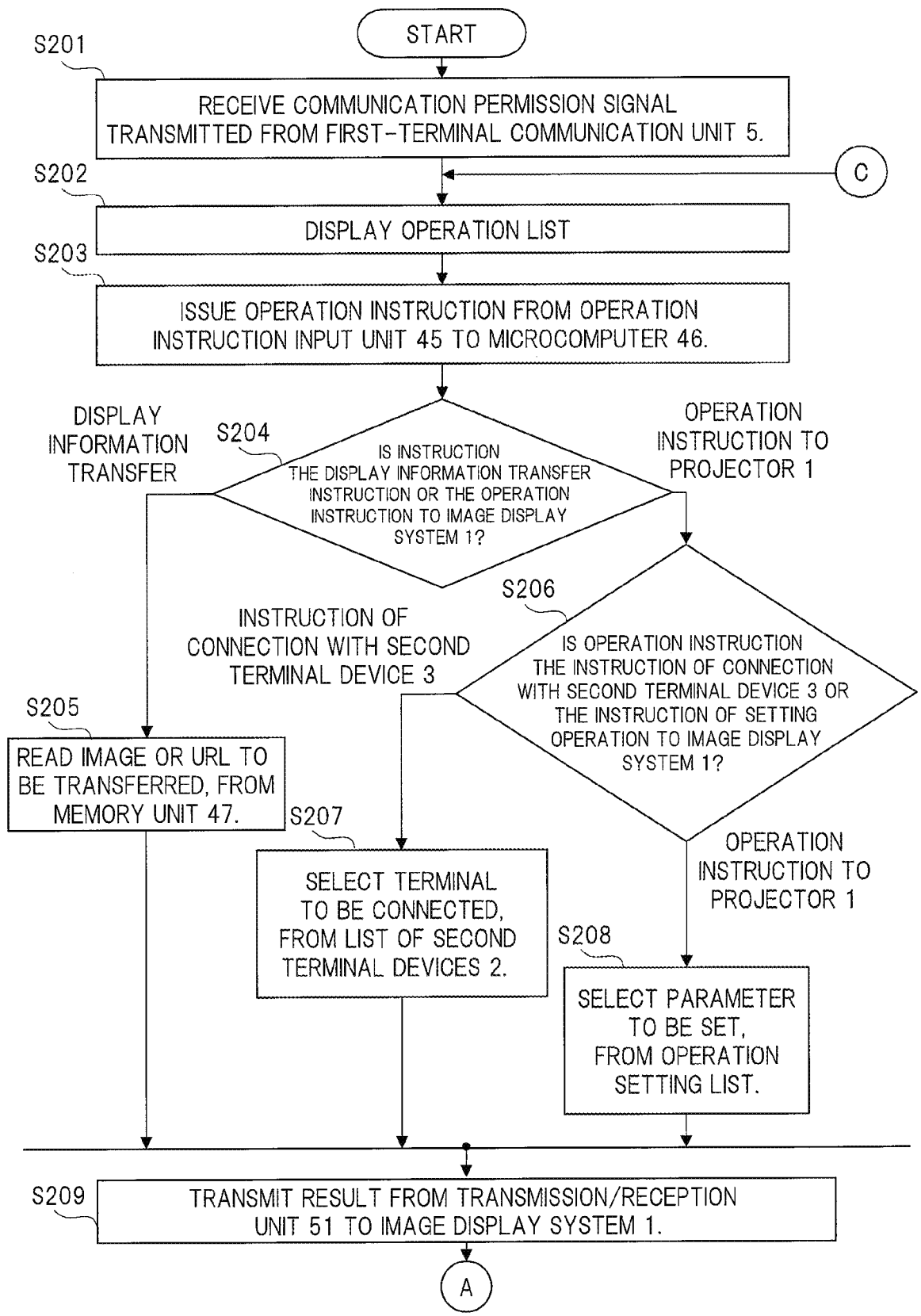
FIG. 5 is a flowchart showing an example of an operation process by the first terminal device of FIG. 4.

FIG. 5 is a flowchart showing an example of the operation process of the first terminal device 2 of FIG. 4. FIG. 5 shows an example of the operation process performed by the first terminal device 2 in the identification connection process performed by the image display system 1 shown in FIGS. 2 and 3.

First, when the transmission/reception unit 51 receives a communication permission signal indicating the communication permission, the communication permission signal being transmitted from the first-terminal communication unit 5 of the image display system 1 (step S201), the microcomputer 46 causes the display image selecting unit 49 to display an operation list, and waits for an instruction input from the user (step S202).

While checking the operation list displayed on the display unit 48, the user gives an instruction to the microcomputer 46 through the operation instruction input unit 45 (step S203).

Here, the instructions of the operation list include, for example, first to third instructions. The first instruction is such an instruction as transferring the image, the file, etc., stored in the first terminal device 2 to the image display system 1, the second instruction is such an operation instruction to the image display system 1 as instructing the connection to the second terminal 3, and the third instruction is an operation instruction to the image display system 1.

In the process of step S203, when the user's instruction is the first instruction (step S204), the microcomputer 46 issues an command so as to read an image, URL, or file to be transferred from the memory unit 47 (step S205). Then, the read image, URL, or file is transmitted to the image display system 1 through the transmission/reception unit 51 (step S209).

When the user's instruction is the second instruction (step S206), the microcomputer 46 selects a terminal to be connected from a list of the second terminal devices 3 previously stored in the memory unit 47 (step S207), and transmits the result of the selection to the image display system 1 through the transmission/reception unit 51 (step S209).

When the user's instruction is the third instruction (step S206), the microcomputer 46 selects a parameter to be set from an operation setting list previously stored in the memory unit 47 (step S208). And, the microcomputer 46 transmits the result of the selection to the image display system 1 through the transmission/reception unit 51 (step S209).

In the manner as described above, the operation process of the first terminal device 2 is ended.

<Example of Operation of Second Terminal Device 3>

Next, an operation process of the second terminal device 3 will be described.

Figure 6:
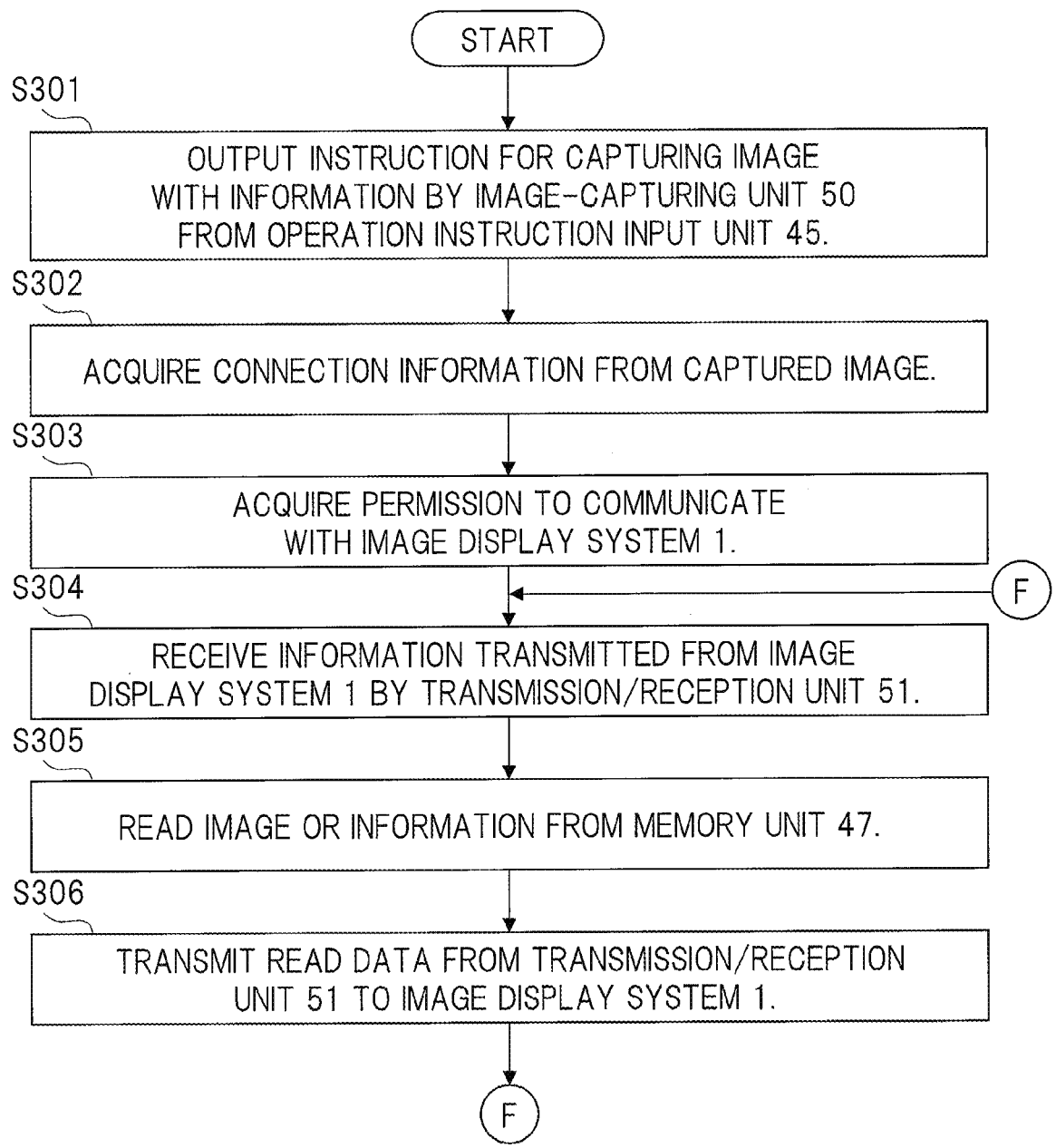
FIG. 6 is a flowchart showing an example of an operation process by a second terminal device of FIG. 1.

FIG. 6 is a flowchart showing an example of the operation process of the second terminal device 3 of FIG. 1. FIG. 6 shows an example of the operation process of the second terminal device 3 in the identification connection process performed by the image display system 1 executes shown in FIGS. 2 and 3.

Note that the configuration of the second terminal device 3 is the same as the configuration of the first terminal device 2 shown in FIG. 4. Therefore, for the explanation for the flowchart of FIG. 6, the explanation will be made with reference to the block diagram of FIG. 4.

First, through the operation instruction input unit 45, the user outputs such an instruction as causing the image-capturing unit 50 to capture the image with the connection information such as QR code projected by the image display system 1 (step S301).

The microcomputer 46 extracts the connection information from the captured image (step S302). Here, this extraction process of the connection information is executed by, for example, a software which is previously stored in a memory not shown, etc., of the microcomputer 46.

The transmission/reception unit 51 transmits the connection information acquired by the extraction by the microcomputer 46 to the image display system 1, and receives image permission information indicating the permission to communicate with the image display system 1 (step S303).

Subsequently, in accordance with the information transmitted from the image display system 1 (step 304), the microcomputer 46 reads out such a command as reading an assigned image or information from the memory unit 47 (step S305).

To the image display system 1, the transmission/reception unit 51 transmits the read image or information and operation information indicating a current operation status of the second terminal device 3, the operation information being output by the microcomputer 46 (step S306). In the manner as described above, the process of the second terminal device 3 is ended.

Through the above-described operations, the connection permission can be made while the first terminal device 2 and the second terminal device 3 are distinguished from each other. As a result, erroneous identification of the first terminal 2 having a large authority or others can be reduced.

The connection of the second terminal device 3 is permitted by the capture of the image projected by the image display system 1, and the second terminal device 3 is connected after the connection permission is checked by the second-terminal communication unit 6. Therefore, the connection to the image display system 1 is easily established.

Besides, the connectable second terminal device 3 can be limited. This limitation can be used for reception permission in the transmission of the information from the second-terminal communication unit 6 of the first terminal device 2 to the second terminal device 3. In this manner, connection to an unintended second terminal device 3 can be prevented, and therefore, information leakage, etc., can be prevented.

Second Embodiment

<Second Configuration Example of Image Display System>

Figure 7:
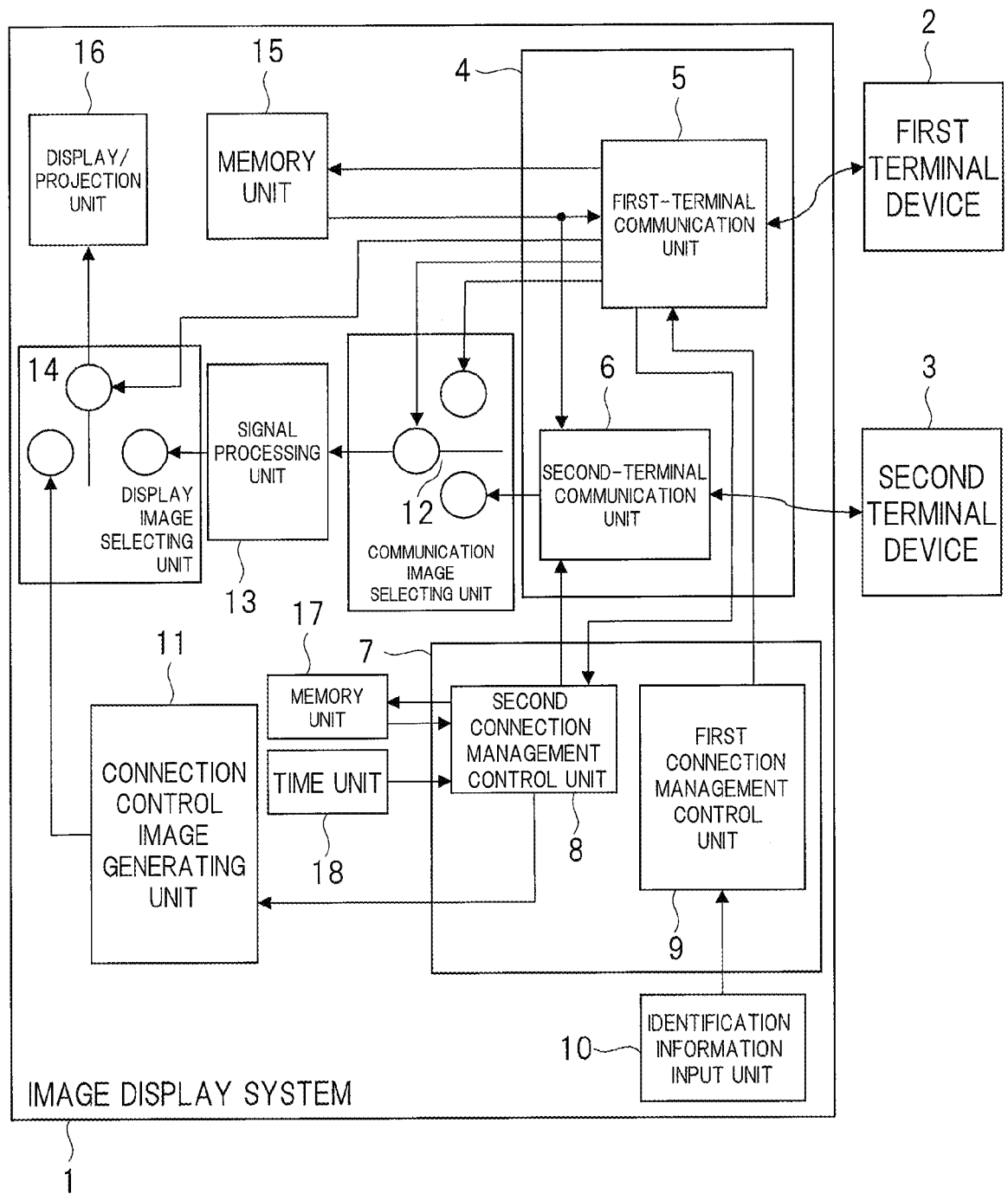
FIG. 7 is a block diagram showing an example of a configuration of an image display system according to a second embodiment.

FIG. 7 is a block diagram showing an example of a configuration of an image display system 1 according to the present second embodiment.

The image display system 1 of FIG. 7 is different from the image display system 1 of FIG. 1 according to the first embodiment in that a memory unit 17 and a time unit 18 are newly provided. Each of the memory unit 17 and the time unit 18 is connected to the second connection management control unit 8.

The memory unit 17 stores the connection information acquired through the communication between the first terminal device 2 and the first-terminal communication unit 5. The time unit 18 outputs time information indicating the current date and time, which is acquired by the second connection management control unit 8 when the current time is added to the connection information. The second connection management control unit 8 reads/writes information from/to the memory unit 17, and acquires the time information from the time unit 18.

Other connection configuration of the image display system 1 of FIG. 7 is the same as that of FIG. 1 according to the first embodiment, and therefore, description thereof will be omitted.

<Example of Operation of Image Display System>

Figure 8:
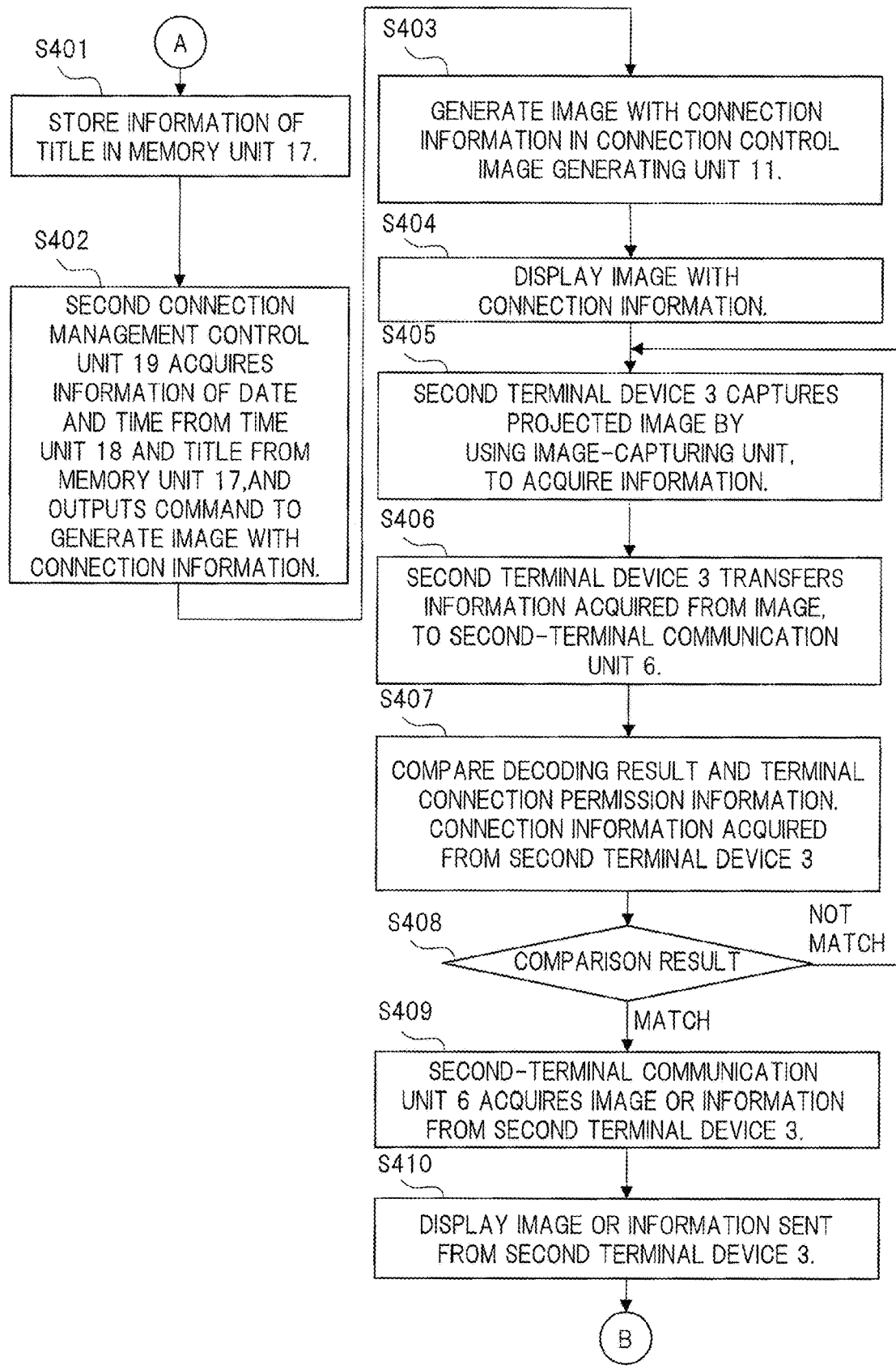
FIG. 8 is a flowchart showing an example of an identification connection process by the image display system of FIG. 7.

FIG. 8 is a flowchart showing an example of an identification connection process by the image display system 1 of FIG. 7.

Note that the flowchart of FIG. 8 shows a process performed after the end of the process of step S107 shown in FIG. 2 according to the first embodiment.

First, the first terminal device 2 transmits such a command as saving a subject title such as a meeting title or a class title that is supposed to start. When receiving the command, the second connection management control unit 8 stores the title in the memory unit 17 (step S401).

Subsequently, the second connection management control unit 8 acquires information of the title from the memory unit 17, and also acquires the current time from the time unit 18. The second connection management control unit 8 outputs such a command as instructing the connection control image generating unit 11 to generate the image with the information including these acquired pieces of information (step S402).

When the connection control image generating unit 11 generates the image with the information (step S403), the first-terminal communication unit 5 outputs a selection signal to the display image selecting unit 14. In this manner, the display image selecting unit 14 establishes the connection so as to output the image with the connection information such as a QR code, which is generated by the connection control image generating unit 11, to the display projection unit 16. The image with the information generated by the connection control image generating unit 11 is projected by the display projection unit 16 through the display image selecting unit 14 (step S404).

The second terminal device 3 acquires the information for the connection to the image display system 1 by the capturing of the projected image with the information by the image-capturing unit 50 included in the second terminal device 3 (step S405).

The second terminal device 3 decodes the image with the information acquired in the process of step S405, and transmits the information, which has been acquired by the decoding, to the second-terminal communication unit 6 (step S406).

The second-terminal communication unit 6 compares the decoding result received by itself from the second terminal 3 with the terminal connection permission information received by itself in the process of step S104 of FIG. 2 to determine whether they match each other (step S407).

If the decoding result matches the terminal connection permission information (step S408), the second-terminal communication unit 6 permits the communication with the second terminal device 3. In this manner, the second terminal device 3 transmits the information such as an image to the second-terminal communication unit 6 (step S409).

The second-terminal communication unit 6 outputs the image, etc., which has been received by itself, to the display projection unit 16 through the signal processing unit 13, so that a desired image is projected (step S410). Also in this case, the first-terminal communication unit 5 outputs a selection signal to the communication image selecting unit 12 and to the display image selecting unit 14 so that the image transmitted from the second terminal device 3 can be projected.

At this time, to the second terminal device 3, the subject title such as the meeting title or the class title on which the user has been attended is transmitted together with the time at which the meeting or the class has been held. By using this information, it can be easily recognized what meeting or class the user of the second terminal device 3 has attended. If they does not match each other (step S408), the process flow returns to step S405. Other operation processes are the same as those of the example of FIG. 1.

In addition to the effect of the first embodiment, the information indicating what meeting, class or others the user of each second terminal device 3 has attended can be easily managed.

And, to the second terminal device 3, the user previously inputs a schedule of a meeting or class on which the user his/herself is supposed to attend, so that connection to a second terminal device 3 which has not been registered as the schedule of the attendance on the meeting or class is not permitted, and the second terminal device 3 can be informed of no schedule of the attendance. In this manner, convenience can be improved.

Further, the invention has such an effect as being capable of founding abusive participation of the second terminal device 3 by reporting an attempt of the connection of the second terminal device 3, which has not been registered as the schedule of the attendance, to the first terminal device 2.

In the second embodiment, note that the image display system 1 may be provided as an apparatus different from the projector as similar to the first embodiment, and that the display projection unit 16 can be replaced with a display projection unit 16 having a display panel such as a liquid crystal panel.

Third Embodiment

<Third Configuration Example of Image Display System>

An image display system 1 according to a third embodiment is different from the image display system 1 of FIG. 1 according to the first embodiment in that a new function is added to the second-terminal communication unit 6 and to the signal processing unit 13.

To the second-terminal communication unit 6, a function of outputting operation information which is information indicating the operation status of the second terminal device 3 is added. The signal processing unit 13 has a function of synthesizing the operation information which is output from the second-terminal communication unit 6 with output information which is output from the communication image selecting unit 12.

Other connection configurations are the same as those of the image display system 1 of FIG. 1, and therefore, are omitted in further description.

<Example of Operation of Image Display System>

Figure 9:
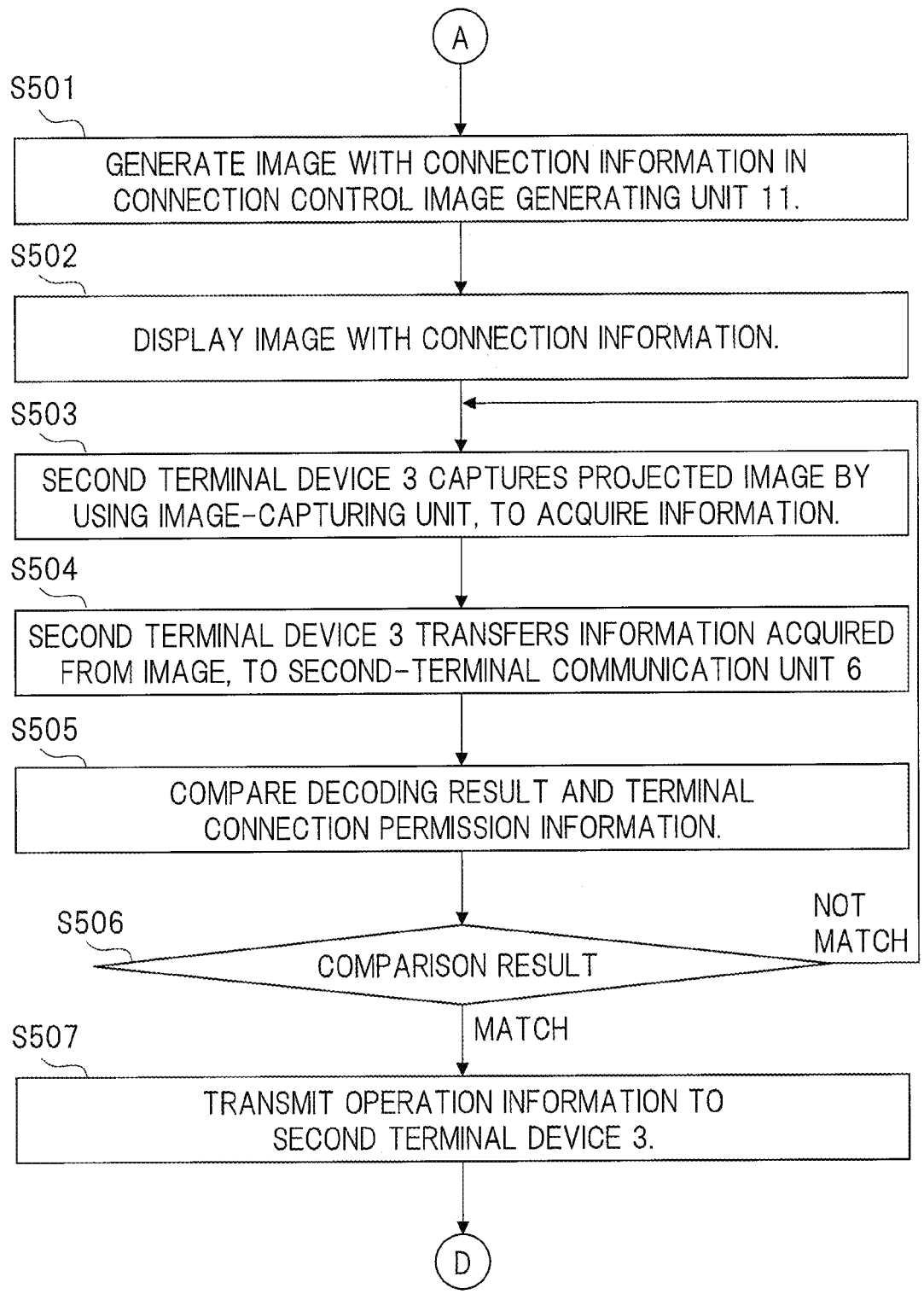
FIG. 9 is a flowchart showing an example of an identification connection process by an image display system according to a third embodiment.
Figure 10:
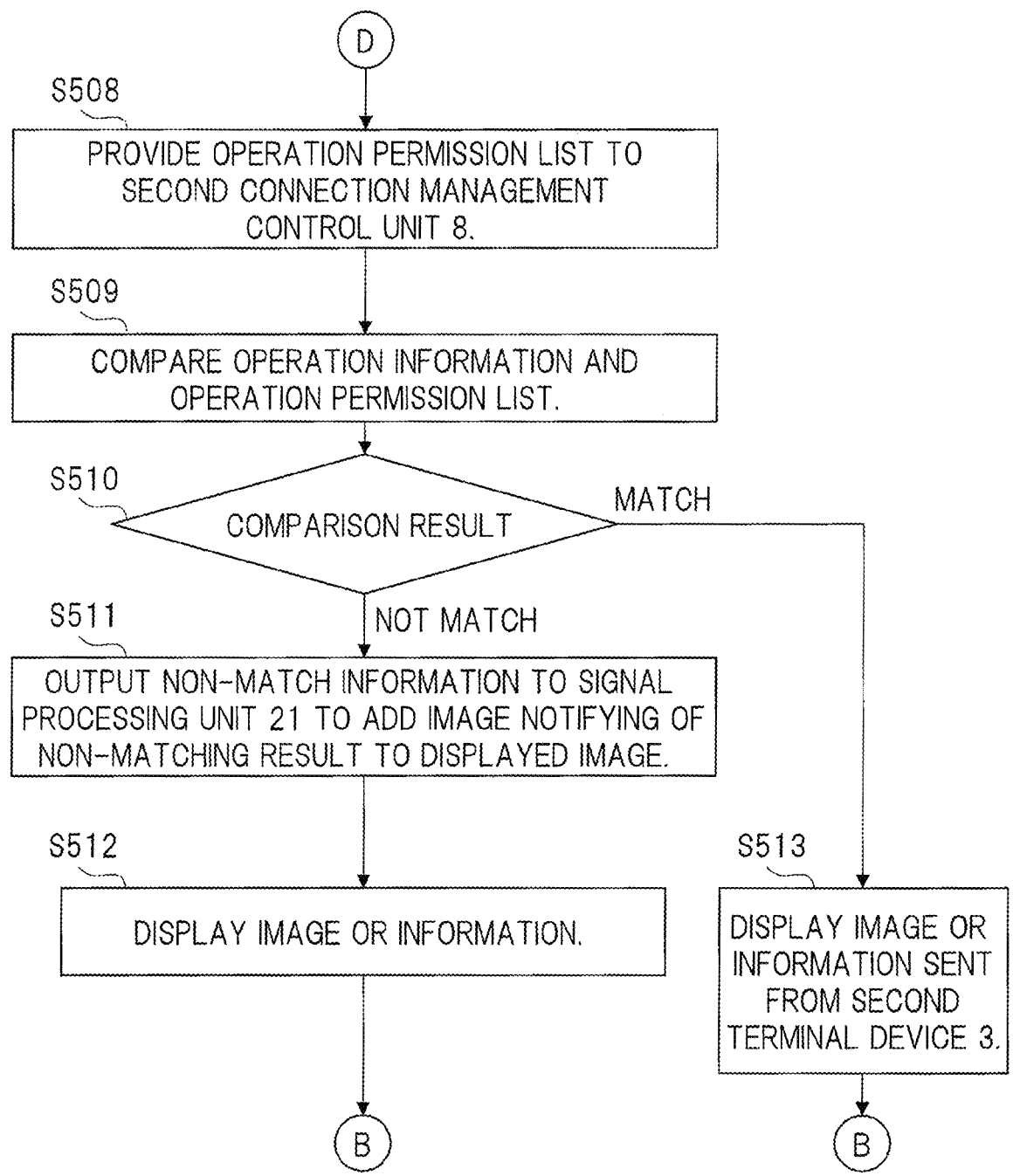
FIG. 10 is a flowchart continued from FIG. 9.

FIG. 9 is a flowchart showing an example of an identification connection process in the image display system 1 according to the present third embodiment. FIG. 10 is a flowchart continued from FIG. 9.

Note that the flowchart shown in FIG. 9 shows a process after the end of the process of step S107 shown in FIG. 2 according to the first embodiment.

Processes of steps S501 to S506 shown in FIG. 9 are the same as the processes of steps S108 to S113 shown in FIG. 3 according to the first embodiment, and therefore, are omitted in further description.

In the process of step S506, when the communication is established 5 between the second terminal device 3 and the second-terminal communication unit 6, the second terminal device 3 transmits the operation information to the second-terminal communication unit 6 (step S507).

Here, this operation information is information which notifies of the operation status of the second terminal device 3 during operation, i.e., notifies of a current status of the second terminal device 3, and is composed of, for example, information such as an application program used by the second terminal device 3 and an URL accessing the Internet, etc.

The first terminal device 2 transmits an operation permission list, which serves as operation permission information, to the first-terminal communication unit 5 (step S508). The operation permission list indicates information such as the application program which can be used by the second terminal device 3 and an URL whose connection is permitted. In other words, the operation permission list indicates the status which is permitted for the second terminal device 3.

As described above, this operation permission list is transmitted from the first terminal device 2. The first terminal device 2 outputs the received operation permission list to the second-terminal communication unit 6. The second-terminal communication unit 6 stores the operation permission list in, for example, a memory (information storage unit) included in the second-terminal communication unit 6 although not shown in the drawing. Alternatively, the operation permission list may be stored in the memory unit 15. Note that the process of step S508 may be performed at any timing as long as performed before the process of step S507.

Subsequently, the second-terminal communication unit 6 compares the received operation information with the operation permission list stored in the memory, etc. (step S509).

If the operation information includes data not matching the operation permission list as a result of the comparison (step S510), a non-match signal which notifies that the operation information includes data not matching the operation permission list is output.

For example, when an application program A is transmitted as the operation information from the second terminal device 3, the second-terminal communication unit 6 searches the operation permission list to determine whether the application program A currently used by the second terminal device 3 is on the operation permission list. If the application program A is not found on the operation permission list, the non-matching signal is output from the second-terminal communication unit 6 to the signal processing unit 13.

The signal processing unit 13 which has received the non-matching signal synthesizes an image notifying of the non-matching result with a currently-projected image, and outputs the synthesized image to the display projection unit 16 (step S511) so as to cause the display projection unit 16 to display the currently-projected image and the image notifying of the non-matching result (step S512).

If the operation information matches the operation permission list (step S510), a desired image transmitted from the second terminal device 3 is projected (step S513).

As described above, in addition to the effect of the first embodiment, the embodiment has such an advantage as finding usage of an application program irrelevant to the currently-held meeting or class or finding the viewing of a Web site irrelevant to the meeting or class by the user of the second terminal device 3.

The non-matching signal output from the second-terminal communication unit 6 can be not projected but transmitted from the first-terminal communication unit 5 to the first terminal device 2. Through this process, the first terminal device 2 can be notified of the second terminal device 3 that is using the application program not permitted to be used or the second terminal device 3 that is viewing contents of the URL not permitted to be viewed.

Also in the third embodiment, note that the image display system 1 may be provided as an apparatus different from the projector as similar to the first embodiment, and the display projection unit 16 can be replaced with a display projection unit 16 having a display panel such as a liquid crystal panel.

Fourth Embodiment

<Configuration Example of Image Display System>

Figure 11:
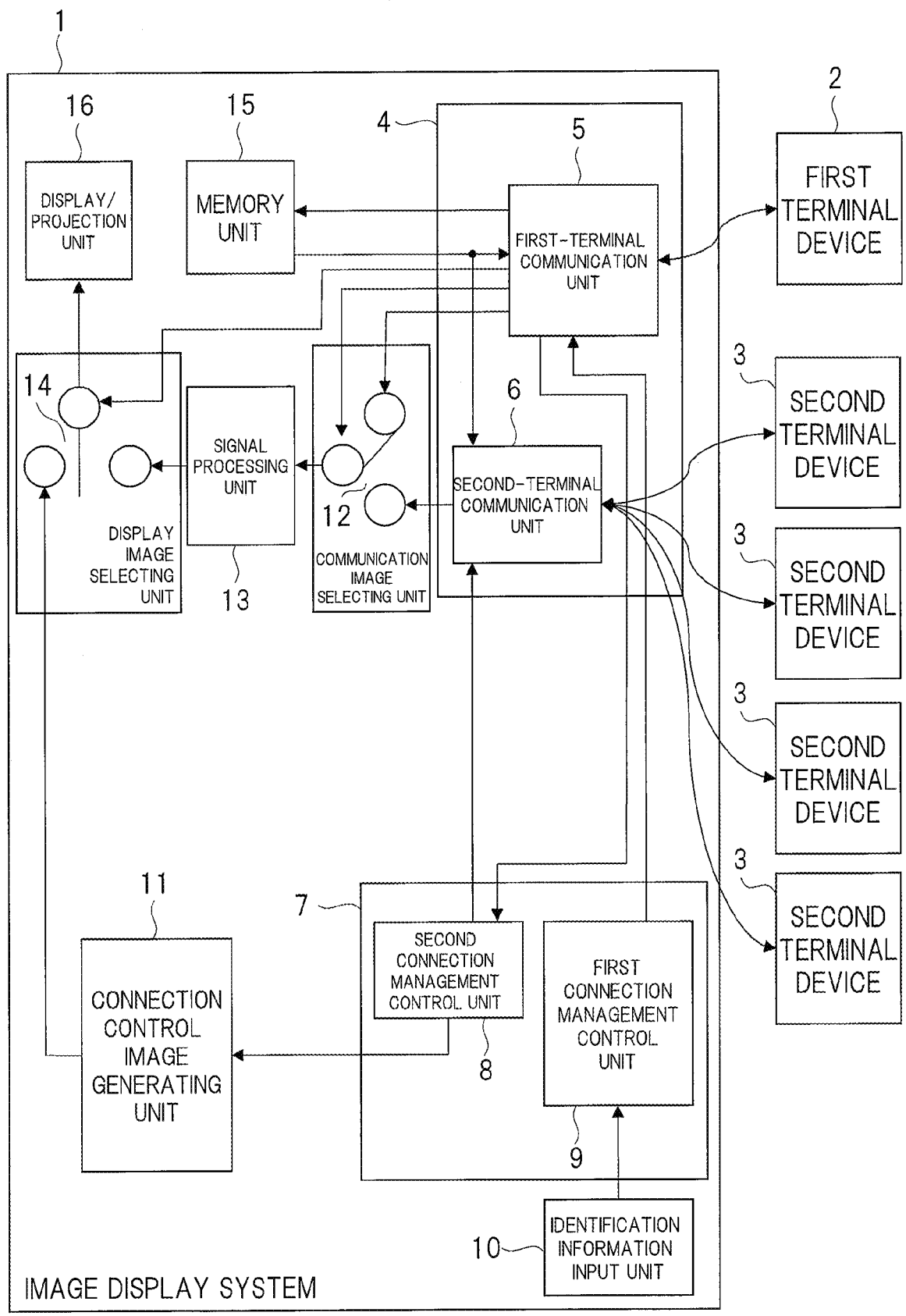
FIG. 11 is an explanatory diagram showing an example of a configuration of an image display system according to a fourth embodiment.

FIG. 11 is an explanatory diagram showing an example of a configuration of an image display system 1 according to the present fourth embodiment.

To the image display system 1 of FIG. 11, four second terminal devices 3 are connected through the wireless communication. In this image display system 1, the second-terminal communication unit 6 has a function of dividing one screen into areas and outputting images transmitted from the different second terminal devices 3 to the divided respective areas. The second connection management control unit 8 has a function of outputting, to the connection control image generating unit 11, such a command as generating a plurality of types of the images with the information.

Other connection configurations are the same as those of FIG. 1 according to the first embodiment, and therefore, are omitted in further description.

<Example of Operation of Image Display System>

Subsequently, the identification connection process of the image display system 1 will be described.

Figure 12:
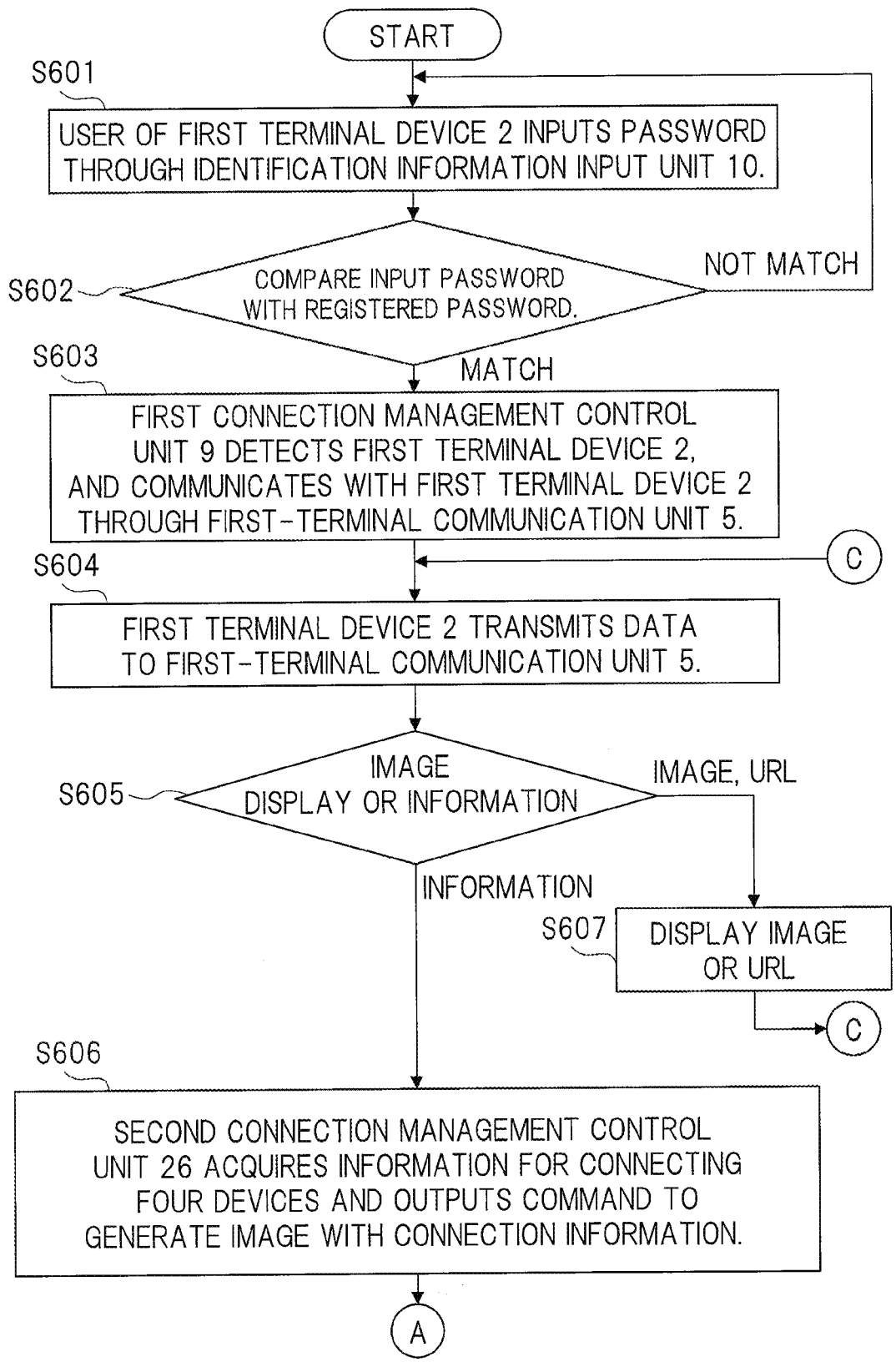
FIG. 12 is a flowchart showing an example of an identification connection process by the image display system of FIG. 11.
Figure 13:
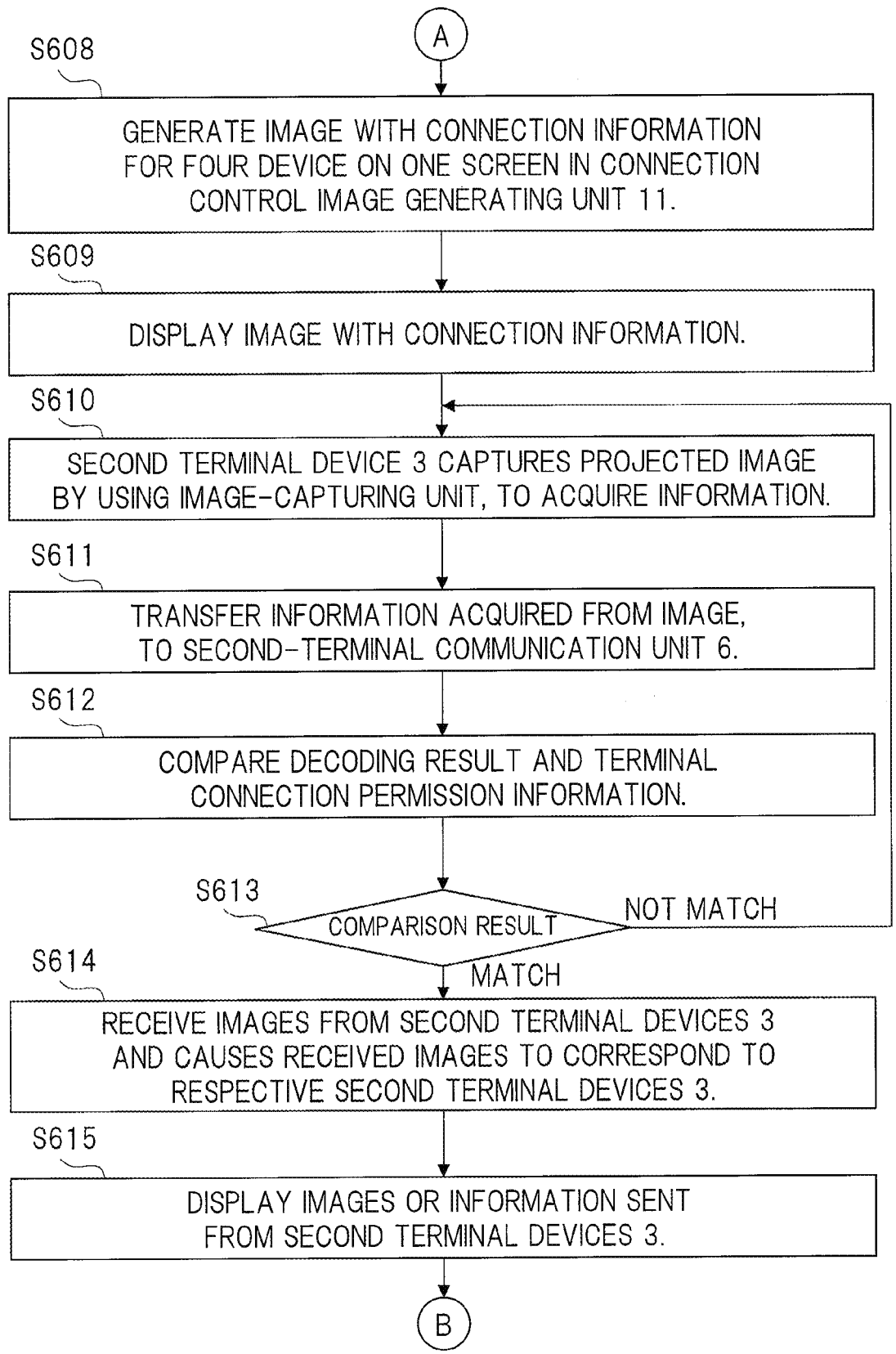
FIG. 13 is a flowchart continued from FIG. 12.

FIG. 12 is a flowchart showing an example of the identification connection process of the image display system 1 of FIG. 11, and FIG. 13 is a flowchart continued from FIG. 12.

Here, for simpler description, an example of dividing a displayed screen into four areas will be described. However, even a case of a different number of the divided areas is obviously the same.

First, processes of steps S601 to S603 shown in FIG. 12 are executed. These processes are the same as the processes of steps S101 to S103 shown in FIG. 2 according to the first embodiment, and therefore, are omitted in further description.

Subsequently, the first terminal device 2 transmits data of either the terminal setting information for assigning the second terminal device 3 transmitting an image to be projected or information of an image, an URL or others to be projected (step S604). Here, the terminal setting information for assigning four second terminal devices 3 is transmitted as the data.

The first-terminal communication unit 5 determines that the data received by itself is either the image or the URL or the terminal setting information to be projected. If the data is the image or the URL to be projected (step S605), a process of step S607 is executed. This process of step S607 is the same as the process of step S106 of FIG. 2.

If the data is the terminal setting information (step S605), the first-terminal communication unit 5 outputs the terminal setting information to the second connection management control unit 8. Based on the terminal setting information, to the connection control image generating unit 11, the second connection management control unit 8 outputs such a command as generating an image with information for four second terminal devices 3 (step S606).

Figure 14:
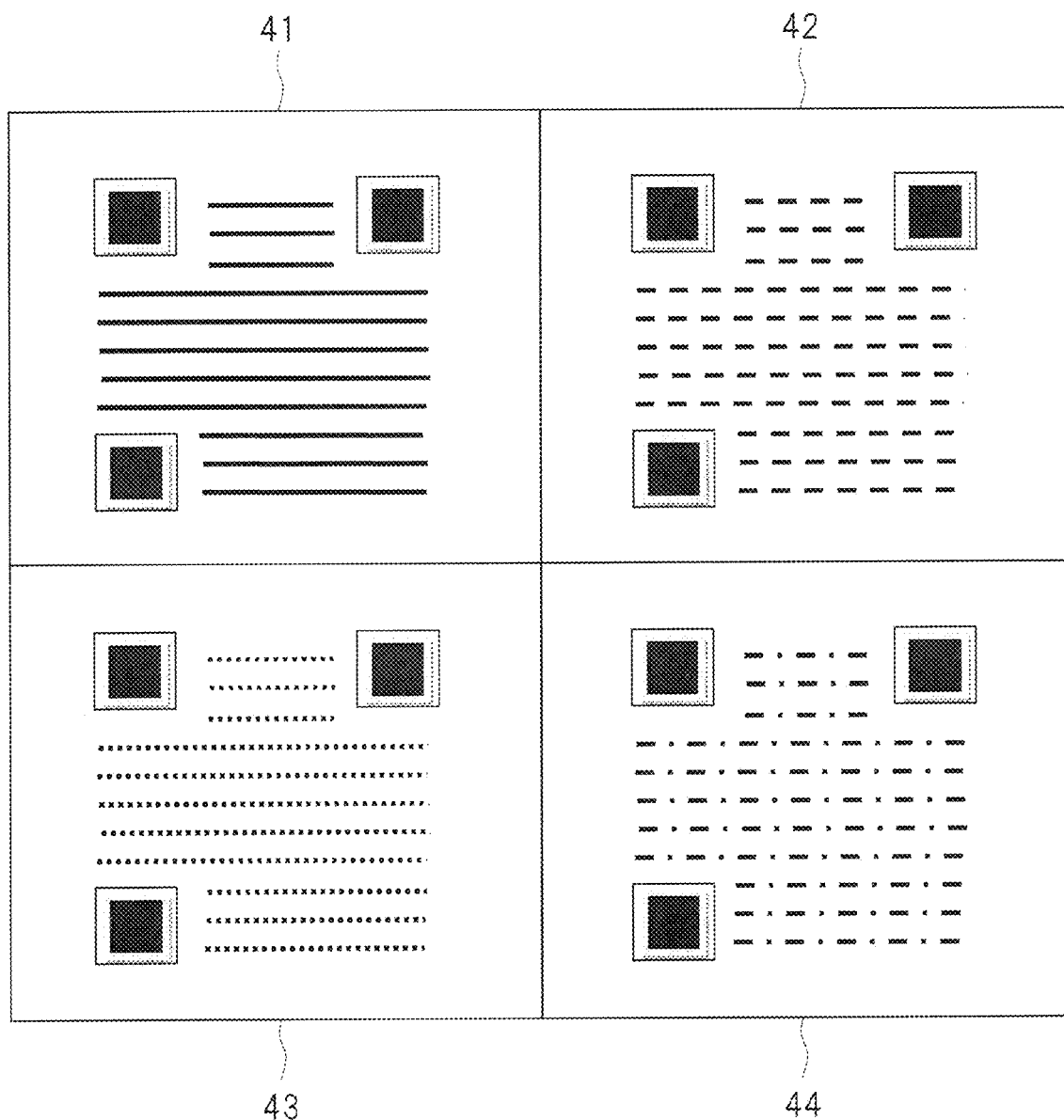
FIG. 14 is an explanatory diagram showing an example of an image with information that is projected by a display projection unit through a process of step S609 of FIG. 12.

Based on the command, the connection control image generating unit 11 generates the images with information 41 to 44 shown in FIG. 14 (step S608). Then, these images with information 41 to 44 are projected by the display projection unit 16 (step S609).

<Example of Images with Information Projected by Display Projection Unit>

FIG. 14 is an explanatory diagram showing an example of the images with information projected by the display projection unit 16 in the process of step S609 of FIG. 12.

As shown in FIG. 14, the connection control image generating unit 11 generates the four images with information 41 to 44. These images with information 41 to 44 contain information of the connection to the image display system 1, the display position of the image, or others.

For example, when a certain second terminal device 3 captures the image with information 41, an image transmitted from this second terminal device 3 is displayed on an upper left part of the screen which is the same position as the image with information 41. The same goes for the images with information 42 to 44.

As described in FIG. 13, the second terminal devices 3 capture the respective images with information 41 to 44 projected on the display projection unit 16 by the image-capturing units 50 and shown in FIG. 14, and decode the images with information (step S610). The result of the decoding is transmitted to the second-terminal communication unit 6 (step S611).

The second-terminal communication unit 6 determines whether the decoding result received by itself matches the terminal connection permission information (step S612). If the decoding result matches the terminal connection permission information (step S613), the second-terminal communication unit 6 permits the communication with the second terminal device 3.

The second-terminal communication unit 6 receives the images transmitted from the second terminal devices 3 whose connections are permitted, in time sequence or all together at once. Subsequently, based on information acquired from the second connection management control unit 8 in the process of step S606, the images transmitted from the respective second terminal devices 3 are output to the communication image selecting unit 12 so as to correspond to the positions of the images with information 41, 42, 43, and 44, respectively (step S614).

The first-terminal communication unit 5 outputs a selection signal to the communication image selecting unit 12 and to the display image selecting unit 14. As a result, the images received by the second-terminal communication unit 6 are output to the signal processing unit 13, and the images generated by processing the signals by the signal processing unit 13 are output to the display projection unit 16.

The first-terminal communication unit 5 outputs the selection signal to the communication image selecting unit 12 and to the display image selecting unit 14. In this manner, to the signal processing unit 13, the communication image selecting unit 12 outputs the images received by the second-terminal communication unit 6. And, to the display projection unit 16, the display image selecting unit 14 outputs the images generated by the signal processing by the signal processing unit 13.

As a result, the desired images transmitted from the four second terminal devices 3 are projected (step S615). Then, if necessary, the processes of steps S116 and S117 of FIG. 3 are executed. In this manner, the identification connection process is ended.

As described above, in addition to the effect of the first embodiment, images transmitted from a plurality of second terminal devices 3 can be projected on one screen. In this manner, the convenience of the user can be improved.

In an area where the second terminal device for displaying the image has been already assigned, an image with no connection information is displayed, so that a different second terminal device can be configured not to be connected to the area.

Further, it is obvious that an image or information on one terminal of the four connected second terminal devices 3 can be displayed on the entire screen by a command from the first terminal device 2.

Also in the fourth embodiment, the image display system 1 may be provided as an apparatus different from the projector as similar to the first embodiment, and the display projection unit 16 can be replaced with a different display projection unit 16 having a display panel such as a liquid crystal panel.

In the foregoing, the invention made by the present inventors has been concretely described based on the embodiments. However, it is needless to say that the present invention is not limited to the foregoing embodiments and various modifications and alterations can be made within the scope of the present invention.

Note that the above-described embodiments have been explained for easily understanding the present invention, but are not always limited to the one including all structures explained above. Further, the other structure can be added to/eliminated from/replaced with a part of the structure of each embodiment. Still further, a part of the entire of each configuration, function, processing unit, processing means and others described above may be achieved by, for example, a hardware through designing using an integrated circuit or others.

Only the control lines and information lines considered to be necessary for proper description are shown, and all the control lines and information lines are not necessarily shown. It can be practically considered that almost all the configurations are connected to one another.

EXPLANATION OF REFERENCE CHARACTERS

1 image display system
2 first terminal device
3 second terminal device
4 communication unit
5 first-terminal communication unit
6 second-terminal communication unit
7 control unit
8 second connection management control unit
9 first connection management control unit
10 identification information input unit
11 connection control image generating unit
12 communication image selecting unit
13 signal processing unit
14 display image selecting unit
15 memory unit
16 display projection unit
17 memory unit
18 time unit
45 operation instruction input unit
46 microcomputer
47 memory unit
48 display unit
49 display image selecting unit
50 image-capturing unit
51 transmission/reception unit

The invention claimed is:

1. An image display method, comprising:
receiving a Uniform Resource Locator (URL) from a first terminal device that is previously wireless-connected to a display apparatus;
displaying an image onto a display of the display apparatus as a first display state, the image being acquired with reference to the URL;
receiving terminal connection permission information from the first terminal device, wherein the terminal connection permission information is for establishing a wireless connection between a second terminal device and the display apparatus; and
displaying a terminal connection image that is generated based on the terminal connection permission information onto the display of the display apparatus as a second display state, wherein the terminal connection image includes identification information for assigning the second terminal device,
wherein the display apparatus is connected to the second terminal device by causing the second terminal device to capture the terminal connection image that is displayed on the display of the display apparatus by the second display state, causing the second terminal device to transmit connection information for connecting the second terminal device to the display apparatus, based on the terminal connection image.

2. The image display method according to claim 1,
wherein the display apparatus is connected to the second terminal device when the terminal connection permission information received from the first terminal device matches with the connection information received from the second terminal device.

3. The image display method according to claim 1,
wherein the terminal connection permission information includes unique information for identifying the second terminal device.

4. The image display method according to claim 1,
wherein the terminal connection image displayed in the second display state is a QR code.

5. The image display method according to claim 1,
wherein, in the second display state, information of current date and current time based on a timer of the display apparatus is added to the terminal connection image.

6. The image display method according to claim 1,
wherein, in the second display state, the terminal connection image is among a plurality of terminal connection images that are displayed, wherein a number of the plurality of the terminal connection images that is displayed is a number of devices whose connection is permitted by the first terminal device.

\* \* \* \* \*